INVENTORS
JOHN FLAMMANG,
PERCY L. BOWSER,
WILLIAM M. VENNER,
AND PERCY L. BOWSER, JR.
BY
THEIR ATTORNEYS.

Oct. 8, 1940.  J. FLAMMANG ET AL  2,217,542
PISTON
Filed Jan. 17, 1938  2 Sheets-Sheet 2
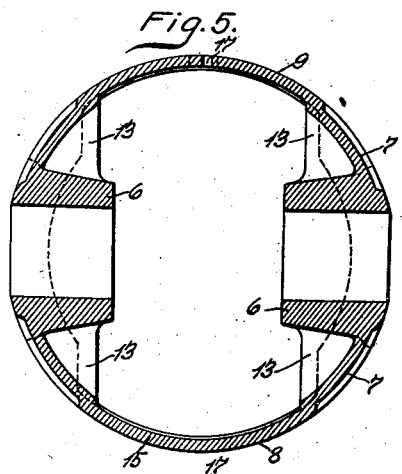
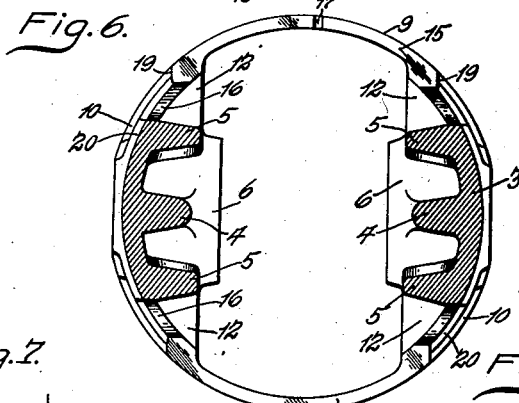
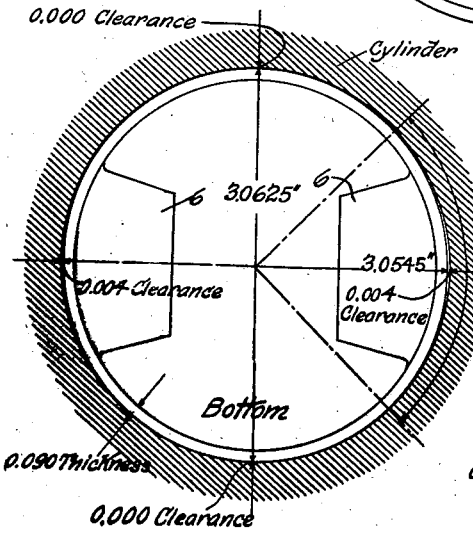
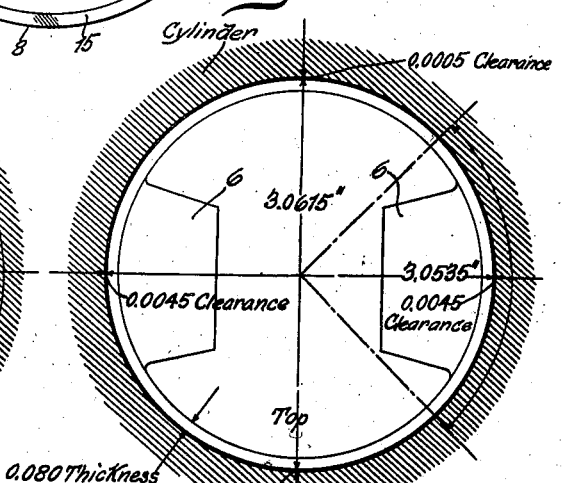
INVENTORS
JOHN FLAMMANG,
PERCY L. BOWSER,
WILLIAM M. VENNER,
BY  AND PERCY L. BOWSER, JR.
THEIR ATTORNEYS.

Patented Oct. 8, 1940

2,217,542

UNITED STATES PATENT OFFICE 2,217,542

PISTON

John Flammang, University City, Percy L. Bowser, St. Louis, William M. Venner, Richmond Heights, and Percy L. Bowser, Jr., University City, Mo., assignors to The Sterling Corporation, St. Louis, Mo., a corporation of Delaware Application January 17, 1938, Serial No. 185,342

3 Claims. (Cl. 309—11)

This invention pertains to trunk pistons of the type used in internal combustion engines and particularly of such pistons when cast of light metal such as aluminum, magnesium or alloys thereof.

One of the objects of this invention is to provide an improved structure for a piston of this type whereby the piston may be given a close fit in the cylinder when cold, while the expansion of the piston upon rise of temperature is taken care of in such a manner as to provide a good fit and an adequate bearing at all working temperatures; and whereby the lubricating oil consumption is reduced to a minimum while securing efficient lubrication.

Further objects will appear from the following description taken in connection with the accompanying drawings in which—

Figure 1:
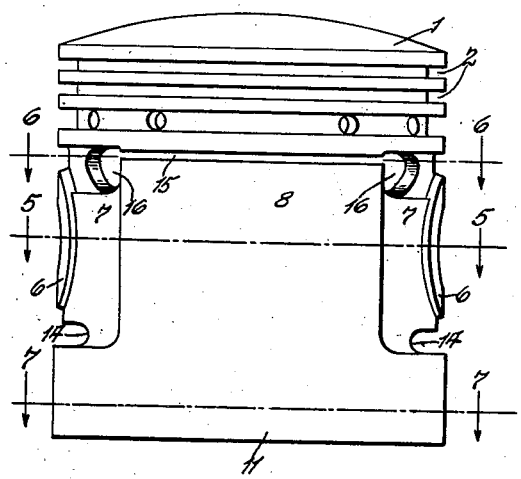
Figure 1 is a side view of a piston embodying this invention taken from one of the thrust faces.
Figure 2:
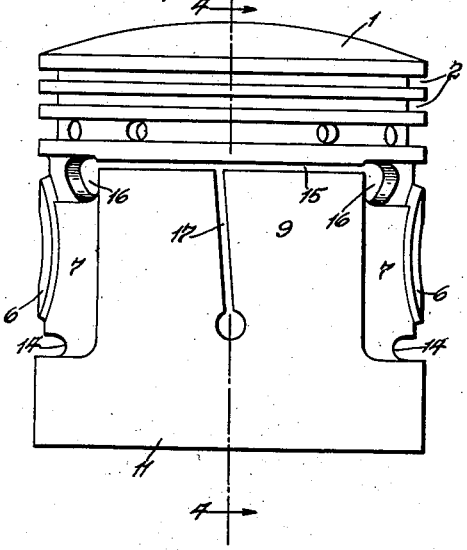
Figure 2 is a similar view showing a longitudinal slot in the thrust face.
Figure 3:
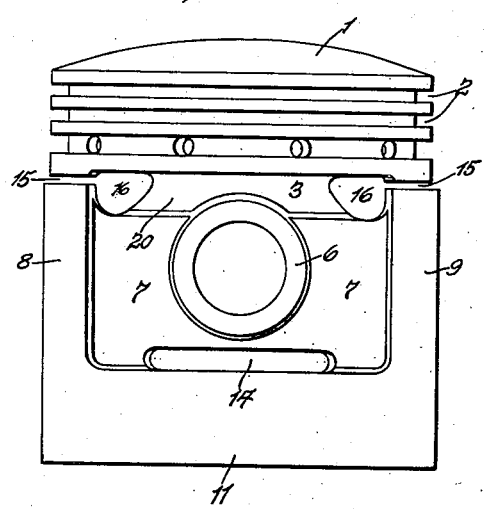
Figure 3 is a side view taken in the direction of the wrist pin axis.
Figure 4:
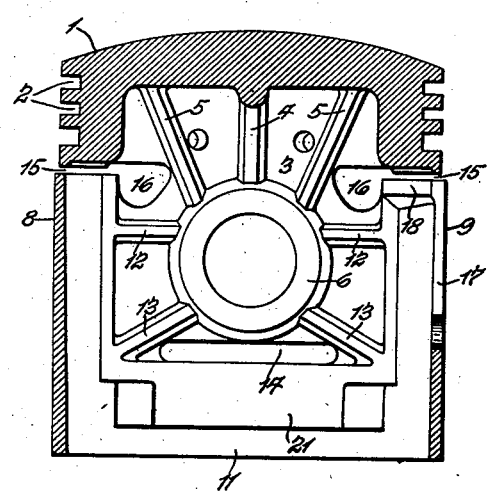

Figure 4 is a longitudinal central section taken perpendicular to the wrist pin axis on the line 4—4 of Figure 2;

Figure 5 is a section on line 5—5 of Figure 1;

Figure 6 is a section on line 6—6 of Figure 1;

Figure 7 is a diagrammatic sectional view taken about on line 7—7 of Figure 1, and Figure 8 is a similar diagrammatic section taken at the upper end of the skirt just below the line 6—6 of Figure 1.

The piston structure comprises a head 1 which is as usual provided with packing ring grooves 2. Depending from the head 1 is a pair of wrist pin bearing connectors indicated generally at 3 and which are reinforced and stiffened, as by ribs 4 and 5. These connectors 3 have at their lower ends the wrist pin bearing bosses 6.

Attached to the head through the connectors 3 is a piston skirt, having arcuate portions 7 extending around the ends of the wrist pin axis and connecting the skirt with the outer portions of said connectors. Joining or merging with said arcuate portions in circumferential continuation thereof are cylinder engaging portions or thrust faces 8 and 9. The arcuate portions 7 over an area thereof surrounding the ends of the wrist pin axis are laterally depressed below the surfaces of the portions 8 and 9 to provide relieved areas 10 in the regions of the pin bosses. Below the relieved areas the skirt is continuous with said cylinder engaging portions as shown at 11, but while the piston skirt is so formed that its end, in the region of the pin axis, may clear the cylinder wall at certain times, it may also bear against the cylinder under certain conditions.

The arcuate portions 7 on the interior thereof are reinforced or stiffened by ribs 12 and 13 radiating from each bearing boss 6, as shown in Figure 4, so as to prevent flexing of the portions 7, while the ribs 4 and 5 rigidly connect these portions with the head. At the bottom of each relieved area and above the bottom of the skirt is a horizontally extending opening 14. The inside of the skirt is provided with segmental parts 21 in the regions of the pin bosses.

The cylinder engaging portions 8 and 9 are separated from the head 1 by horizontally extending slots 15. The upper parts of these portions are also spaced from the connectors 3 by openings 16 extending through the skirt; but the bottoms of the openings are above the wrist pin bearing bore. These openings provide upper segmental parts of the bearing faces which extend above their junctions with the portions 7 and the connectors 3.

In order to form the openings 16 in casting, short projections are formed upon the core and, since the surfaces 19 at the edges of the relieved portions extend in such a direction that they cannot be formed by the core portions, a portion of the relieved area indicated at 20 is depressed somewhat below the level of the area 10. This provides on the mold a portion forming the area 20 which extends inwardly to meet and abut the end of the core projection forming the opening 16. By this arrangement the flow of metal is terminated at the junction of these mold and core parts in such a manner as to provide a smooth edge for the opening 16 and so as not to leave a burr to be removed later.

It is not necessary to slot the cylinder-engaging portions vertically; but one of these portions 8 or 9, usually the one which takes the side thrust on the compression stroke, may be provided with a longitudinal slot 17. As shown in Figure 2, this slot stops short of the lower end of the skirt but joins the slot 15. The portions 8 and 9 may, as shown in Figure 4, be made thinner at the top than at the bottom. In accordance with Figure 4, this is done by flaring the inner surface of these portions upwardly so that the inside diameter thereof is greater at the top than at the bottom. The amount of this flare depends upon the diameter of the piston; thus in a three inch piston the skirt thickness may be 0.08 inch at the top and 0.09 at the bottom.

It has been found advantageous in some instances where the slot 17 is used, to stiffen the upper corners of the cut portion of the skirt by a circumferentially extending rib 18, which decreases in depth to the slot.

By making the skirt thinner at the top additional control of the flexibility of the skirt is obtained, particularly at the upper segmental parts formed by the openings 16. It is sometimes desirable to adjust the flexibility in these regions with considerable nicety in order that the skirt may follow variations in the shape of the cylinder. By adjusting the thickness the desired degree of flexibility can often be obtained without the necessity of slotting the skirt. It is sometimes desirable, also, to have the skirt measurably stiffer at the bottom than at the top and this result may be obtained by varying the thickness as described.

The entire skirt including the portions 8 and 9 together with the end at 11, are given an oval shape by the well known so-called cam grinding so as to make the diameter along the wrist pin axis slightly less than that along the transverse axis. This is accomplished by a cylindrical clearance in the regions of the bosses at the bottom of the skirt and into which then merges the oval or elliptical formation in the regions of the bearing faces. The skirt is also made slightly smaller at the top than at the bottom. All of this is shown in Figures 7 and 8 which give the dimensions of a piston which has been found successful. This may be given as follows:

With a cylinder bore of 3.0625, the diameter at the open end of the skirt taken on the axis of the cylinder-engaging faces may be nearly equal to the cylinder bore, namely, 3.0625, while the diameter along the pin box axis at the same end may be 3.0545, giving a radial clearance of .004″. At the upper end of the skirt just below the slots 15 the diameter on the axis of the cylinder-engaging faces may be 2.0615, while the diameter along the pin box axis at this end may be 3.0535. This makes the circumference of the skirt slightly less at the upper end than at the lower end. The diameter of the head 1 at the packing ring lands is given a considerably greater clearance; this diameter may be made 3.0440, giving a radial clearance at this point of about .0094. The thickness of the cylinder-engaging portions of the skirt may be .090 at the bottom or open end and .080 at the top. The depth of the relieved area 10 below the surfaces of the portions 8 and 9 may be 0.30. These dimensions are set forth in a general way in Figures 7 and 8.

A piston embodying this invention is capable of adjusting itself to the cylinder from a condition when cold to a condition when hot, and this is accomplished with a minimum of clearance and with a minimum of oil consumption while securing effective lubrication. The head and skirt are firmly and rigidly connected so as to resist all stresses to which a piston is subjected. The skirt in the regions of the pin bosses is also reinforced so as to be rigid as distinguished from flexible; accordingly, there is no tendency of the skirt to shear in the regions of these bosses. The elliptical contour of the thrust faces, together with a separation of the skirt from the head in the regions of these thrust faces, permits the skirt to accommodate itself to the cylinder from a cold to a hot condition while maintaining the desired close fit. The formation of the upper segmental thrust face parts also prevents scoring of the piston at the top. As pointed out it is not necessary to slot this piston vertically, but where slotting is resorted to the circumferential ribs at the top of the slit bearing face serve to control this thrust face at the top.

It will be understood that certain individual features or sub-combinations of this device may be useful by themselves, without reference to other features of the complete combination, and that the employment of such individual features or sub-combinations is contemplated by this invention and with the scope of the appended claims.

It is obvious that various changes may be made within the scope of the appended claims in the details of construction without departing from the spirit of this invention; it is to be understood, therefore, that this invention is not limited to the specific details shown and described.

Having thus described the invention, what is claimed is:

1. An all-aluminum piston having a head, wrist-pin boss connectors depending therefrom and rigidly connected thereto, a skirt continuous at the bottom and having a thin, flexible cylinder-engaging thrust wall in a region between said connectors and separated from said head, laterally depressed and vertically wide webs on said connectors extending horizontally to said wall athwart the wrist-pin axis, and a wrist-pin boss on each web, each of said webs being provided on the inside thereof with reenforcing ribs extending outwardly from the boss therein and distributed substantially throughout the vertical width of the web to render it substantially unyielding under horizontal loading applied at its ends, each web being connected with the lateral portions of said wall, with the vertical width of each web-end extending along a side edge of said wall, the bearing surface of said wall being formed with a slightly elliptical eccentricity.

2. An all-aluminum piston having a head, wrist-pin boss connectors depending therefrom and rigidly connected thereto, a skirt continuous at the bottom and having a thin, flexible cylinder-engaging thrust wall in a region between said connectors and separated from said head, laterally depressed and vertically wide webs on said connectors extending horizontally to said wall athwart the wrist-pin axis, and a wrist-pin boss on each web, each of said webs being provided on the inside thereof with reenforcing ribs extending outwardly from the boss therein and distributed substantially throughout the vertical width of the web to render it substantially unyielding under horizontal loading applied at its ends, each web being connected with the lateral portions of said wall, with the vertical width of each web-end extending along a side edge of said wall, the bearing surface of said wall being formed with a slightly elliptical eccentricity, and said wall being thinner at its upper end than at its lower end rendering the same more flexible at its hotter portion.

3. An all-aluminum piston having a head, wrist-pin boss connectors depending therefrom and rigidly connected thereto, a skirt continuous at the bottom and having a thin, flexible cylinder-engaging thrust wall in a region between said connectors and separated from said head, laterally depressed and vertically wide webs on said connectors extending horizontally to said wall athwart the wrist-pin axis, and a wrist-pin boss on each web, each of said webs being provided on the inside thereof with reenforcing ribs extending outwardly from the boss therein and distributed substantially throughout the vertical width of the web to render it substantially unyielding under horizontal loading applied at its ends, each web being connected with the lateral portions of said wall, with the vertical width of each web-end extending along a side edge of said wall, the bearing surface of said wall being formed with a slightly elliptical eccentricity, one bearing wall of said skirt having a slot extending downwardly from said head but terminating above the end of said skirt.

JOHN FLAMMANG.
PERCY L. BOWSER.
WILLIAM M. VENNER.
PERCY L. BOWSER, Jr.